United States Patent
Hung et al.

(10) Patent No.: US 11,991,808 B2
(45) Date of Patent: May 21, 2024

(54) ELECTRONIC DEVICE WITH AMBIENT LIGHT FLICKER SENSOR

(71) Applicant: Apple Inc., Cupertino, CA (US)

(72) Inventors: Po-Chieh Hung, Sunnyvale, CA (US); Serhan O. Isikman, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 969 days.

(21) Appl. No.: 16/034,179

(22) Filed: Jul. 12, 2018

(65) Prior Publication Data

US 2020/0022239 A1    Jan. 16, 2020

(51) Int. Cl.
*H05B 47/11* (2020.01)
*G09G 3/32* (2016.01)
*H05B 45/14* (2020.01)

(52) U.S. Cl.
CPC .............. *H05B 47/11* (2020.01); *G09G 3/32* (2013.01); *H05B 45/14* (2020.01); *G09G 2320/0626* (2013.01)

(58) Field of Classification Search
CPC .. G09G 3/32; G09G 2320/0626; H05B 45/14; H05B 45/22; H05B 47/11
USPC ................. 345/204, 207, 589–591
See application file for complete search history.

(56) References Cited

U.S. PATENT DOCUMENTS

| | | | |
|---|---|---|---|
| 8,330,829 B2 | 12/2012 | Goh et al. | |
| 8,711,245 B2 | 4/2014 | Kinrot et al. | |
| 9,823,117 B2 | 11/2017 | Wieser et al. | |
| 2003/0142239 A1* | 7/2003 | Yoshida | H04N 5/235 348/607 |
| 2008/0303918 A1* | 12/2008 | Keithley | G09G 3/20 348/223.1 |
| 2012/0075497 A1* | 3/2012 | Urisaka | H04N 5/2357 348/222.1 |
| 2012/0320232 A1* | 12/2012 | Trumbo | H04N 5/2356 348/226.1 |
| 2014/0232902 A1* | 8/2014 | Kim | H04N 1/4092 348/226.1 |
| 2015/0070337 A1* | 3/2015 | Bell | G09G 3/2096 345/207 |
| 2015/0172529 A1* | 6/2015 | Aota | H04N 5/378 348/228.1 |
| 2016/0344992 A1* | 11/2016 | D'Alfonso | A61B 1/00006 |

(Continued)

*Primary Examiner* — Ke Xiao
*Assistant Examiner* — Nelson Lam
(74) *Attorney, Agent, or Firm* — Treyz Law Group, P.C.; G. Victor Treyz; Kendall P. Woodruff (57) ABSTRACT

An electronic device may be operated in ambient light. The electronic device may have a color ambient light sensor that is configured to produce color ambient light sensor data based on the ambient light. The electronic device may also have a flicker sensor that has a faster response time than the color ambient light sensor and that is used in detecting dynamic changes in the ambient light. Control circuitry in the electronic device may analyze flicker sensor data to identify the number of light sources producing the ambient light. The control circuitry may apply a frequency transform to the flicker sensor data or make measurements with the flicker sensor in multiple directions. Based on this information, the control circuitry may identify the number of light sources and may use this information in retrieving an ambient light spectrum associated with the ambient light using the color ambient light sensor data.

20 Claims, 8 Drawing Sheets

(56) References Cited

U.S. PATENT DOCUMENTS

2016/0373628 A1\* 12/2016 Nakajima ................ H04N 5/58
2017/0034494 A1\* 2/2017 Kang ................... H04N 5/2357
2018/0070068 A1\* 3/2018 Zhao ..................... H04N 9/045

\* cited by examiner

ELECTRONIC DEVICE WITH AMBIENT LIGHT FLICKER SENSOR

BACKGROUND

This relates generally to electronic devices, and, more particularly, to light sensors for electronic devices.

Electronic devices such as laptop computers, cellular telephones, and other devices are sometimes provided with light sensors. For example, ambient light sensors may be incorporated into a device to provide the device with information on current lighting conditions. Ambient light readings may be used in controlling the device. If, for example bright daylight conditions are detected, an electronic device may increase display brightness to compensate. Color ambient light sensors can detect changes in the color of ambient light so that compensating color cast adjustments can be made to displayed content.

It can be challenging to measure ambient lighting conditions with a color ambient light sensor. If care is not taken, color ambient light sensor measurements will be insufficiently accurate for use in compensating for undesired color casts produced in certain ambient lighting environments.

SUMMARY

An electronic device may be operated in an environment with ambient light. The ambient light may be provided by a number of light sources. In some situations, a single light source is present. In other situations, multiple light sources are present. Sensor measurements may be used to accurately determine the color spectrum associated with each light source and therefore the color spectrum associated with the ambient light.

The electronic device may have a color ambient light sensor that is configured to produce color ambient light sensor data based on the ambient light. The electronic device may also have a flicker sensor that has a faster response time than the color ambient light sensor and that is used in detecting dynamic changes (flicker) in the ambient light.

Control circuitry in the electronic device may analyze flicker sensor data to identify the number of light sources present. The control circuitry may apply a frequency transform to the flicker sensor data or may make measurements with the flicker sensor in multiple directions. Based on this information, the control circuitry may identify the number of light sources present and may use this information in retrieving an ambient light color spectrum associated with the ambient light using the color ambient light sensor data. The control circuitry may make white point adjustments to displays and image sensors based on the color spectrum.

DETAILED DESCRIPTION

Figure 1:
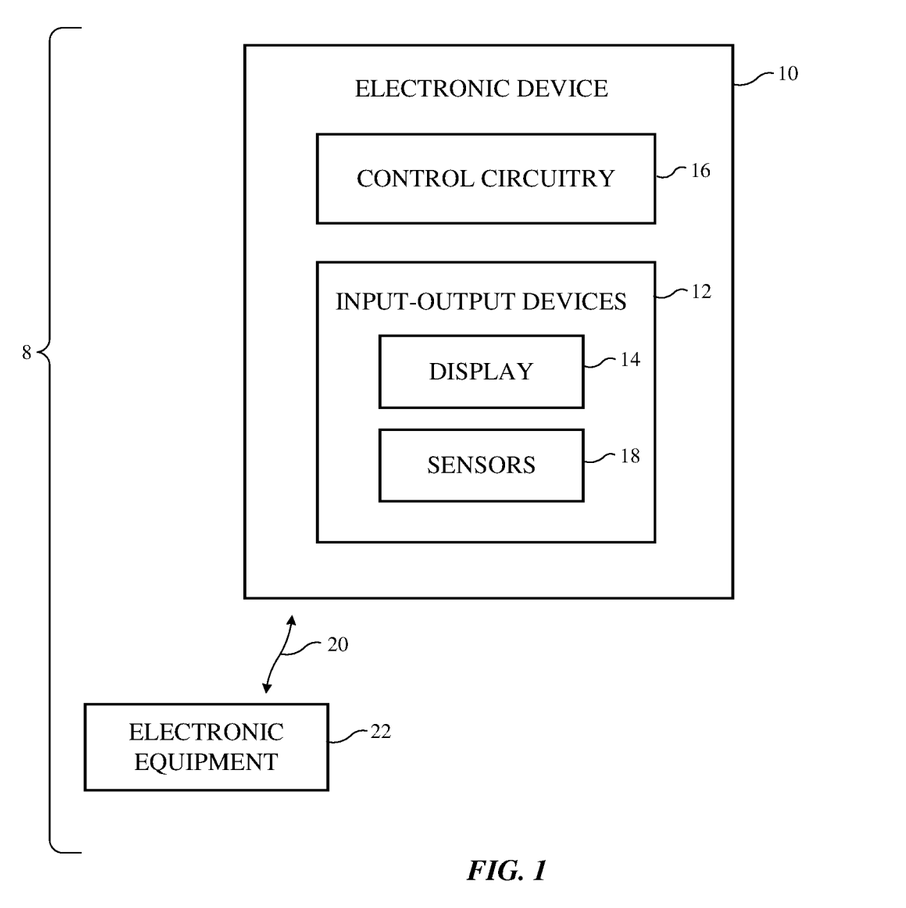
FIG. 1 is a schematic diagram of an illustrative electronic device having an ambient light flicker sensor in accordance with an embodiment.

An illustrative electronic device of the type that may be provided with light sensing capabilities is shown in FIG. 1. As shown in FIG. 1, system 8 includes electronic device 10. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be an organic light-emitting diode display, a liquid crystal display, or other suitable display.

Input-output devices 12 may also include sensors 18. Sensors 18 may include a capacitive sensor, a light-based proximity sensor, a magnetic sensor, an accelerometer, a force sensor, a touch sensor, a temperature sensor, a pressure sensor, a compass, a microphone, a digital image sensor (e.g., one or more visible light cameras, infrared cameras, and/or other devices using digital image sensors), and other sensors.

Sensors 18 may also include one or more color ambient light sensors. A color ambient light sensor may be used to measure the color (color spectrum, color temperature, color coordinates, etc.) of ambient light and may be used to measure ambient light intensity.

To measure time-dependent changes in lighting intensity, sensors 18 may include a color or monochrome ambient light sensor that is sensitive to variations in light intensity as a function of time (e.g., ambient light flicker). This type of sensor, which may sometimes be referred to as a flicker sensor, may, if desired, have a faster time response than a color ambient light sensor in device 10. For example, a color ambient light sensor might have a response time of at least 100 ms, at least 0.5 s, at least 1 s, less than 1.5 s, or other suitable response time, whereas a flicker sensor may have a response time of at least 0.1 microseconds, at least 1 microsecond, at least 10 microseconds, at least 100 microseconds, at least 1 ms, at least 10 ms, less than 100 ms, less than 20 ms, less than 1 ms, less than 150 microseconds, less than 15 microseconds, or other suitable response time. If desired, flicker sensor and color ambient light sensor photodetector devices may be shared (e.g., to produce a combined color ambient light sensor and flicker sensor, to provide color ambient light sensing and flicker sensing components on a common die, etc.). Arrangements in which color ambient light sensors and flicker sensors are separate devices may sometimes be described herein as an example.

To make color measurements, a color ambient light sensor in device 10 may have multiple photodiodes overlapped by multiple respective wavelength filters each of which passes light of a different color. By measuring the signal from each photodiode, a color ambient light sensor may provide color information on ambient light in each of multiple channels (e.g., in each channel corresponding to a different color of light passed to a respective photodiode by a respective band pass filter). The color characteristics of ambient light that are measured in this way can be presented in color coordinates, as a color temperature, etc.

More accurate ambient light spectral information can be obtained by identifying the light source(s) present in the user's environment and retrieving spectral information for those light source(s) from a database. Color ambient light sensor information, information on the number of light sources present, and/or information from a flicker sensor may be used in determining the color spectrum of ambient light. Suitable action can then be taken based on the color spectrum (e.g., the white point of a display and/or a camera in device 10 can be adjusted).

Flicker sensors can gather information on dynamic changes in ambient light intensity. For example, sunlight may have a direct-current (DC) characteristic, because the intensity of a ray of sunlight does not vary over time, whereas a modern fluorescent bulb may have an alternating-current (AC) characteristic associated with an electric ballast running at a frequency of 50 Hz-40 kHz (as an example). During operation of device 10, a flicker sensor can measure the frequency components of ambient light to determine whether the ambient light contains sunlight, fluorescent light, or both sunlight and fluorescent light. This information can then be used to determine the color spectrum of the ambient environment surrounding device 10, so that appropriate actions can be taken. Flicker sensors can be implemented using monochrome detector(s) or can include multiple photodetector with multiple associated band pass filters (wavelength filters) of multiple respective colors. Color flicker sensors such as these may gather dynamic ambient light measurements (flicker data measurements) in multiple different color channels (e.g., red, green, blue, etc.) to help characterize ambient light.

As shown in FIG. 1, device 10 of system 8 may communicate with one or more external devices in system 8 such as electronic equipment 22 over communications paths such as communications path 20. Communications path 20 may include a wired communications path and/or a wireless communications path. For example, communications path 20 may include paths through local and wide area networks such as the internet. Electronic equipment 22 may include one or more computers (e.g., one or more servers) and/or other electronic devices. Database information and other information may, if desired, be stored in equipment 22 and/or in devices such as device 10. For example, control circuitry in device 10 may be used in maintaining a color database or waveform database and/or a server implemented on equipment 22 may be used in implementing an online color database and/or an online waveform database. The color database may include a mapping between ambient light sensor color measurements and corresponding light sources. The waveform database may include a mapping between flicker signal waveforms and corresponding light sources. Light sources in these databases may be characterized by a light source type (light-emitting diode, incandescent lamp, sunlight, halogen light, etc.), a manufacturer name, an output light spectrum, and/or other light source information.

Consider, as an example, a scenario in which a color ambient light sensor in device 10 includes five channels, each having a photodetector with a respective color filter configured to pass a different color band. A color database (in this example) may contain a mapping between various sets of five channel color sensor measurements and various light sources. A first set of five channels of color measurement data may correspond to a first type of light source, whereas a second set of five channels of color measurement data may correspond to a second type of light source. The color database may include a first portion with data for a series of different light sources in a single-light-source environment and may include a second portion with information for mixed lighting environments (environments with multiple light sources).

For example, during calibration operations, a set of different light sources (e.g., thousands of light sources or more or other suitable number of light sources) may be characterized in a single-light-source environment (e.g., a test environment in which only a single light source is present at a time). From each light source characterization measurement, a corresponding set of five color channel magnitudes is produced and a corresponding light spectrum is gathered. During look-up operations, a color ambient light sensor measurement (e.g., five color channel values in an illustrative configuration in which the color ambient light sensor in device 10 includes five channels) can be used to look-up which of the light sources in the single-light-source portion of the database corresponds to the measured ambient light sensor data and can be used to determine the output light spectrum associated with that light source.

The color database may also contain a mixed-lighting-environment portion. The mixed lighting portion may contain color ambient light sensor data measurements (e.g., sets of photodiode signal values) corresponding to respective mixed light environments. A first color ambient light sensor measurement (range of measurements) can be associated with an indoors mixed lighting environment (e.g., a representative indoors lighting environment containing no outdoors light, some fluorescent light, some light-emitting diode light, and/or some incandescent light, as an example), a second color ambient light sensor measurement (range of measurements) can be associated with an outdoors lighting environment (e.g., a representative outdoors lighting environment containing typical sunlight and no fluorescent or light-emitting diode light), and a third color ambient light sensor measurement can be associated with an environment that contains both indoor and outdoor lighting.

Device 10 and/or external equipment 22 may be used in maintaining a waveform database that associates measured light intensity waveforms (intensity variations as a function of time) with expected signal intensity characteristics for respective light sources. During operation, device 10 may use a flicker sensor to capture ambient light waveform information and can compare this information to the waveform database to identify light source(s) in the operating environment of device 10. The flicker information that is gathered may contain multiple channels of flicker data (e.g., flicker data for each of multiple different color flicker sensor channels). Arrangements in which the flicker sensor in device 10 is a monochrome flicker sensor may also be used.

Figure 2:
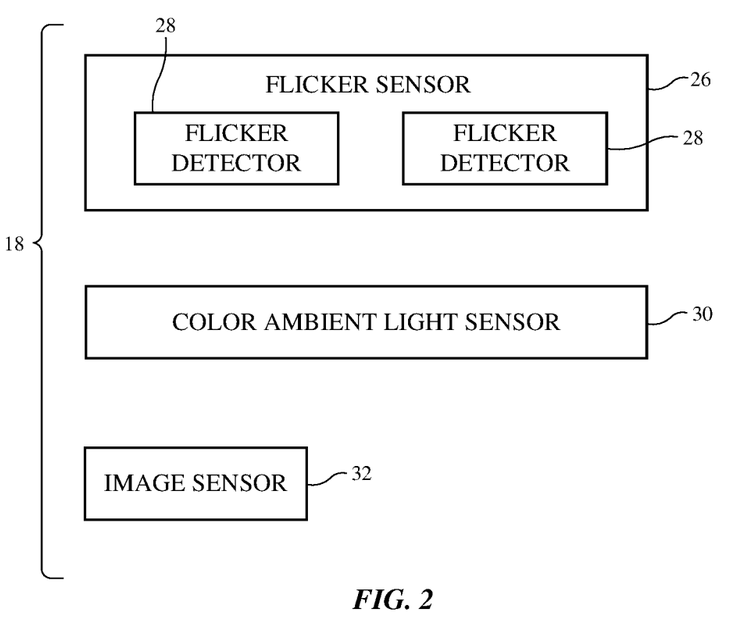
FIG. 2 is a schematic diagram of illustrative sensor components in an electronic device in accordance with an embodiment.

FIG. 2 is a diagram of illustrative light-based sensor circuitry in device 10. As shown in FIG. 2, sensors 18 may include sensors that capture images such as digital image sensor 32. Digital image sensor 32 may be a visible light digital image sensor (e.g., part of a forward-facing or rear-facing visible light camera) or may be an infrared digital image sensor. To ensure that image captured with a visible digital image sensor such as sensor 32 do not have undesired color casts, the color settings (e.g., the white point) of sensor 32 may be adjusted based on the color spectrum of the ambient light in the environment surrounding device 10. If, as an example, the environment in which device 10 is being operated has a high color temperature (e.g., cold outdoor lighting), the white point of image sensor 32 may be set to a relatively cold (bluish) color. If, on the other hand, the environment in which device 10 is being operated has a low color temperature (e.g., warm indoor lighting), the white point of image sensor 32 may be set to a relatively warm (yellowish) color. By adjusting the white point of a visible image sensor in device 10 based on the spectrum of the ambient light, the image captured with that image sensor will have a pleasing appearance to the user of device 10 when displayed on display 14. If desired, the white point of display 14 may be adjusted based on the spectrum of the ambient light in the environment surrounding device 10. In some arrangements, white point adjustments may be made to both image sensor 32 and display 14 based on the spectrum of the ambient light in the operating environment of device 10.

Device 10 includes sensors such as color ambient light sensor 30 and flicker sensor 26 that may be used in conjunction with database information in determining the color spectrum of the ambient light in the operating environment of device 10.

Color ambient light sensor 30 may have multiple photodetectors each of which has an associated color filter. The color filter associated with each photodetector may pass a band of light of a different respective color to that photodetector for measurement. There may be, for example, at least three, at least four, at least five, at least six, at least eight, at least ten, fewer than 20, or other suitable number of photodetectors (channels) each of which is used in measuring light of a different color.

Flicker sensor 26 may include one or more flicker detectors 28. Each detector 28 may be a monochrome detector or may have multiple channels each with a respective photodetector overlapped by a respective color filter configured to pass a band of wavelengths associated with a different respective color (e.g., detectors 28 may be monochrome flicker detectors or color flicker detectors and flicker sensor 26 may be a monochromatic or color flicker sensor).

Flicker sensor 26 may respond more rapidly to light intensity fluctuations than color ambient light sensor 30, which allows flicker sensor 26 to measure light intensity fluctuations of potentially high frequencies. The frequency response of flicker sensor 26 may cover, for example, fluctuations with frequencies of at least 15 Hz, at least 30 Hz, at least 60 Hz, at least 120 Hz, at least 240 Hz, at least 1 kHz, at least 5 kHz, at least 10 kHz, at least 20 kHz, less than 40 kHz, less than 25 kHz, less than 15 kHz, less than 8 kHz, etc.). The ability of flicker sensor 26 to detect rapid variations in light intensity (sometimes referred to as light intensity flicker or ambient light flicker) allows sensor 26 to take measurements that characterize the type of light sources in the operating environment of device 10. From this information, light sources can be identified and the spectrum of the ambient light around device 10 can be determined.

During operation, control circuitry 16 (and/or control circuitry in electronic equipment 22) may use sensors 18 such as color ambient light sensor 30 and flicker sensor 26 to gather measurements on ambient light. Analysis operations (e.g., waveform decomposition, frequency transforms, etc.) may be performed to identify the number of light sources present in the operating environment for device 10 and the type of light source(s) that are present in the operating environment for device 10. From these identified light sources and/or other measurements (e.g., ambient light measurements at one or more orientations, etc.) the spectrum of the ambient light surrounding device 10 can be determined and suitable action may be taken (e.g., white point adjustments may be made).

With one illustrative arrangement, a frequency transform such as a Fourier transform is applied to a flicker measurement made with flicker sensor 26. The sample may be gathered by control circuitry in system 8 using flicker sensor 26. The duration of the gathered sample may be about 200 ms, less than 400 ms, more than 50 ms, or other suitable flicker sensor sample duration. Applying the frequency transform to the flicker sensor data transforms the time-based flicker sensor data that has been sampled into frequency-based flicker sensor data.

Figure 3:
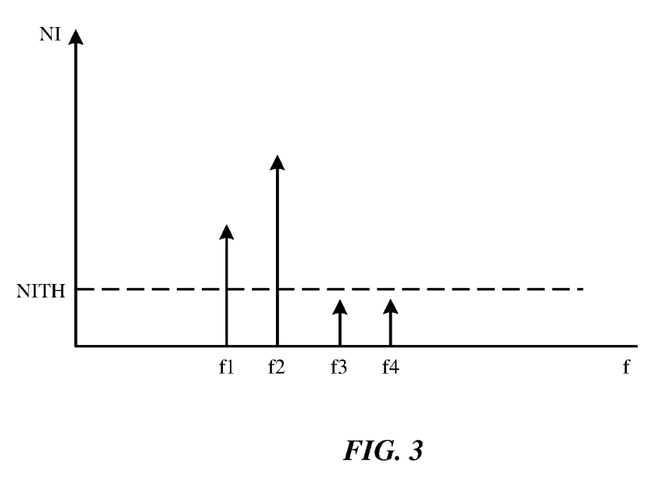
FIG. 3 is a graph of frequency components that may be present in an illustrative lighting environment in accordance with an embodiment.

FIG. 3 is a graph in which frequency transformed flicker sensor data (light intensity NI) has been plotted as a function of frequency f. An intensity threshold NITH (sometimes referred to as a noise threshold) may be applied to the decomposed signals to determine whether a given frequency component corresponds to a strong fundamental frequency (e.g., a frequency associated with the operation of a light source) or a weaker non-fundamental frequency (e.g., noise).

In the example of FIG. 3, the flicker sensor data has been decomposed into two fundamental frequencies f1 and f2 and two noise frequencies f3 and f4. In general, there may be any suitable number of light sources in the environment surrounding device 10 and any suitable number of fundamental frequencies may be identified by applying the frequency transform to the sampled flicker sensor data. The example of FIG. 3 in which there are two fundamental frequency components and two noise frequency components is illustrative.

Figure 4:
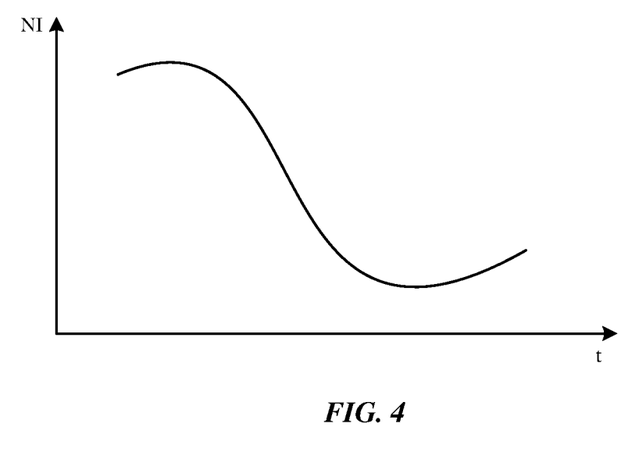
FIG. 4 is a graph of an illustrative measured intensity versus time waveform measured by a flicker sensor in an illustrative lighting environment in accordance with an embodiment.

FIG. 4 shows how sampled light intensity NI from flicker sensor 26 may vary as a function of time for an illustrative light source. A single-cycle waveform curve is shown in the example of FIG. 4. In a color flicker sensor, gathered flicker sensor data may include multiple curves corresponding to respective color channels in the flicker sensor (curves for different colors). The use of a flicker sensor with multiple color channels (multiple photodetectors covered with respective different color filters for detecting ambient light flicker at different respective colors) may help enhance light source detection accuracy (e.g., because the flicker signature of different light sources can be more accurately measured using color rather than monochrome data).

During set-up operations, a color database can be populated with information mapping color ambient light sensor measurements to various different light source and color spectra. A waveform database can also be populated with information on the intensity waveforms associated with different light sources (e.g., flicker data at one or more colors). Using information such as the fundamental frequencies of FIG. 3, the number of light sources present in the user's environment can be determined. The number of light sources present can also be measured by taking multiple flicker sensor measurements in multiple corresponding different directions. This information and information on color measurements with ambient light sensor 30 and/or waveform measurements can then be used to determine the light spectrum of the ambient light environment for device.

Figure 5:
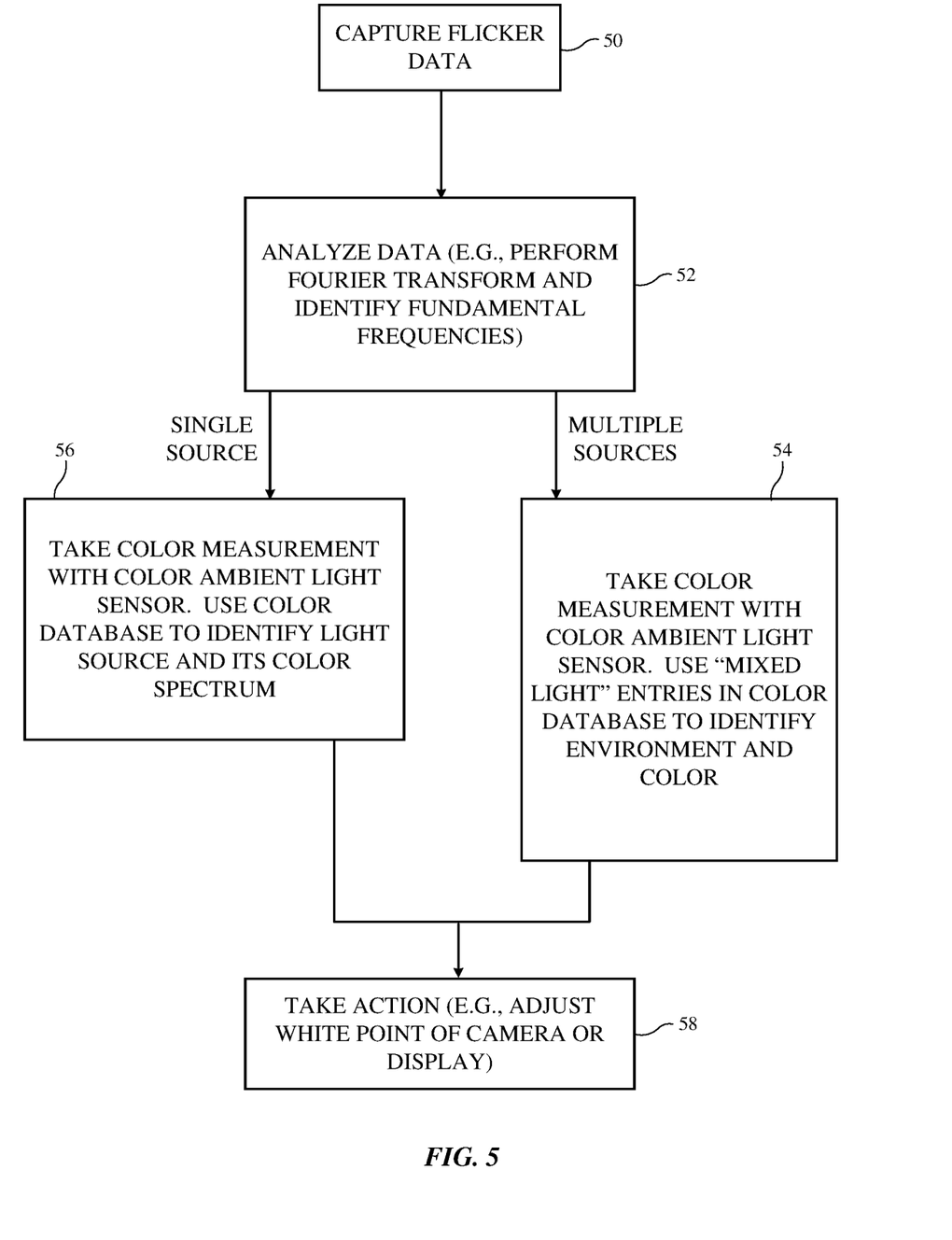
FIGS. 5 and 6 are flow charts of illustrative operations involved in using an electronic device with a flicker sensor in accordance with an embodiment.

A flow chart of illustrative operations associated with using system 8 is shown in FIG. 5. In the illustrative arrangement of FIG. 5, operations may be performed using a color database maintained in system 8 (e.g., without using a waveform database).

During the operations of block 50, control circuitry 16 uses flicker sensor 26 to gather flicker sensor data. A sample of 50-400 ms or other suitable duration may be gathered.

During the operations of block 52, control circuitry in system 8 (e.g., control circuitry 16) may apply a Fourier transform or other frequency transform to the flicker data to decompose the flicker data into frequency components as described in connection with FIG. 3. Fundamental frequencies may be identified by comparing the frequency components that are present in the output of the frequency transform to a threshold (e.g., threshold NITH of FIG. 3). The number of fundamental frequencies that are present in the flicker sensor signal can then be identified. This number corresponds to the number of light sources present and therefore identifies how many light sources are contributing light to the ambient light surrounding device 10. If desired, multiple color flicker sensor measurements each corresponding to a measurement in a different orientation (e.g., a different ambient light sensor sensing direction) may be made and used in determining the number of light sources that are present in a mixed light source scenario (e.g., by using single value decomposition to decompose measured flicker sensor waveform data into principle components and counting the major principle components to determine the number of light sources). The number of different measurements made with the flicker sensor should equal or exceed the number of light sources. For example, in an environment with three light sources, three flicker sensor measurements in different directions are sufficient to determine that there are three light sources present. Arrangements in which both Fourier analysis and flicker sensor measurements in multiple directions are used in counting the number of light sources present may also be used.

If a single light source is detected during block 52, control circuitry 16 can conclude that a single light source is present in the operating environment of device 10. Accordingly, control circuitry 16 may use color ambient light sensor 30 to gather a color ambient light measurement during the operation of block 56. The color ambient light sensor data that is gathered in this way (e.g., the photodetector signal level measured for each of the different color channels in the color ambient light sensor) can be used in a look-up operation in a single light source portion of the color database. In this way, the control circuitry of system 8 can be used to identify the light source corresponding to the color ambient light sensor data. The color spectrum of the output light from the light source is known from the database, so this process identifies the color spectrum of the ambient light surrounding device 10.

In response to detection of multiple light sources during the operation of block 52, control circuitry 16 can use color ambient light sensor 30 to gather a color ambient light sensor measurement during the operations of block 54. The color measurement can then be used to look up an appropriate mixed light entry in a mixed light portion of the color database. The mixed light entry that is identified in this way is associated with an ambient light color spectrum (e.g., a cold outdoors spectrum, a warm indoors spectrum, or a mixed spectrum corresponding to mixed indoors and outdoors lighting).

During the operations of block 58, the color spectrum of the single light source that was identified during the operations of block 56 or the color spectrum of the mixed light that was identified during the operations of block 54 may be used in taking suitable action. For example, during the operations of block 58, control circuitry 16 can adjust the white point of image sensor 32 and/or can make other color adjustments (color cast adjustments) to image sensor 32 and/or control circuitry 16 can adjust the white point of display 14 and/or can make other color adjustments (color cast adjustments) to display 14. These color adjustments may be made based on the color spectrum of the ambient light that was identified from the color database during the operations of block 56 or 54.

Figure 6:
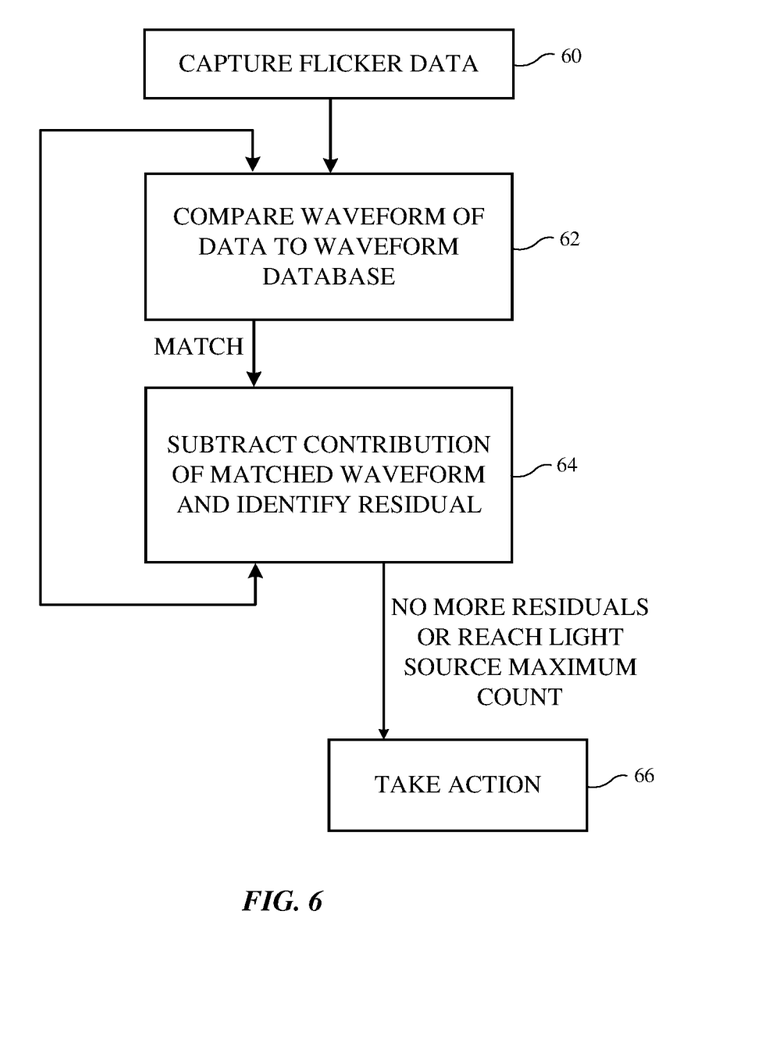

If desired, system 8 may include an ambient light flicker waveform database. The waveform database may be maintained on device 10 and/or remote equipment 22 (e.g., as an online database). Online database information can be accessed in real time using communications link 20, if desired. A flow chart of illustrative operations associated with using system 8 in an arrangement in which system 8 includes a waveform database is shown in FIG. 6.

During the operations of block 60, control circuitry 16 uses flicker sensor 26 to gather flicker sensor data. A sample of 50-400 ms or other suitable duration may be gathered.

During the operations of block 62, control circuitry in system 8 (e.g., control circuitry 16) may compare the captured ambient light sensor waveform from the flicker sensor (e.g., an ambient light waveform such as the illustrative waveform of FIG. 4) to the waveform information in the waveform database. The waveform database may include information mapping measured ambient light waveforms to corresponding light sources and may include an output light spectrum for each of the light sources. If no match between the measured waveform and the waveforms of the waveform database is identified, processing can continue at block 66, where suitable actions can be taken based on a predetermined light source spectrum (e.g., a default spectrum).

In response to detecting a match between the waveform and one of the waveforms in the waveform database, the contribution to the flicker sensor sample that is due to the identified waveform is removed during the operations of block 64, thereby producing a residual signal. The residual signal may be compared to the waveforms in the waveform database to identify an additional possible match. Once all component waveforms in the database have been removed from the flicker sensor waveform in this way or once the number of identified waveforms has reached a predetermined maximum value (e.g., 3 or 4 or other suitable value), the control circuitry of system 8 may identify an ambient light spectrum for the environment surrounding device 10 by summing (with appropriate weighting) each of the contributing ambient light spectrums corresponding to each of the matched light source waveforms from the light source waveform database.

Suitable action based on the ambient light spectrum may be taken during the operations of block 66 (e.g., color adjustments such as white point adjustments may be made to image sensor 32 and/or display 14).

Figure 7:
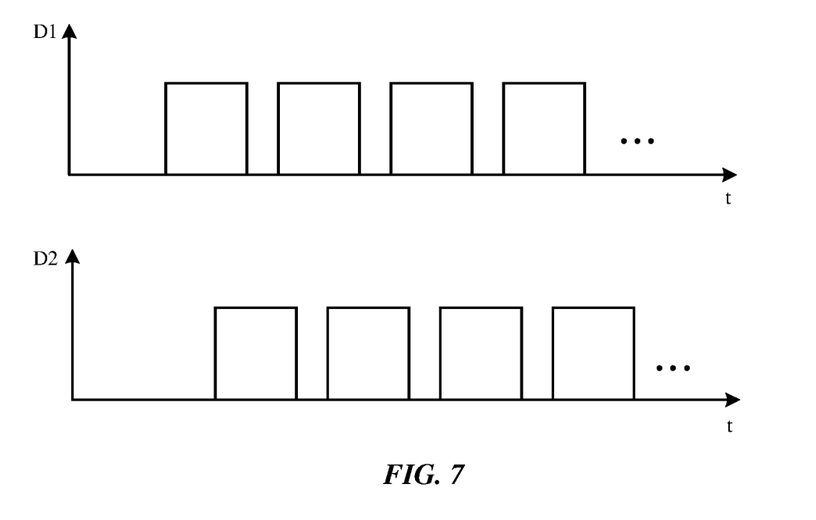
FIGS. 7 and 8 are graphs showing how a flicker sensor with multiple flicker detectors can be used in gathering flicker data in accordance with an embodiment.

To enhance ambient light measurement accuracy, control circuitry 16 may take measurements alternately with a first of flicker detectors 28 and a second of flicker detectors 28. As shown in FIG. 7, for example, a first flicker detector 28 may make measurements during the periods of time during which detector sensitivity D1 is high (see, e.g., the upper trace of FIG. 7) and a second flicker detector 28 may be used to make measurements during the periods of time during which detector sensitivity D2 is high (see, e.g., the lower trace of FIG. 7). The first flicker detector detects light in a first sequence of time periods and the second flicker detector detects light in a second sequence of time periods. The first and second sequences of time periods are staggered so that the first sequence of time periods covers gaps between the time periods in the second sequence of time periods and vice versa. At the same time, the first and second sequences of time periods partially overlap, so that light is continuously being detected by at least one of the detectors. The overlap between the periods of time where the first and second detectors are measuring light may help reduce aliasing effects that might otherwise arise in the presence of ambient light sources with sharp intensity fluctuations such as the intensity fluctuations that arise when light source drive signals are pulse-width modulated during the process of regulating output light intensity.

Figure 8:
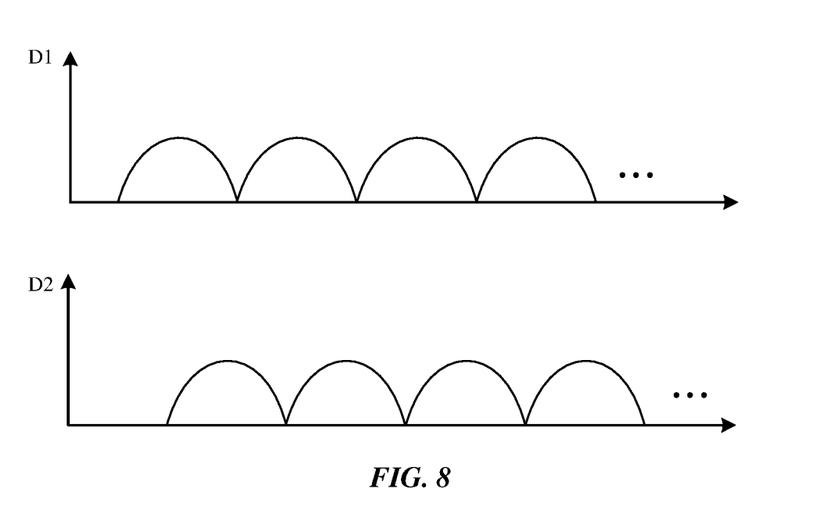

Another illustrative configuration for operating flicker detectors 28 is shown in FIG. 8. In this example, the first and second flicker detectors are used in gathering ambient light data during sequences of measurement time periods that partially overlap. To enhance accuracy in the illustrative configuration of FIG. 8, the gain (relative detector sensitivity) of each detector may be varied using a smooth envelope (e.g., a Gaussian curve). For example, the periods of detection (on periods) associated with the first detector (detector sensitivity D1 in the upper trace of FIG. 8) and the periods of detection associated with the second detector (detector sensitivity D2 in the lower trace of FIG. 8) may have symmetrical Gaussian shapes that partially overlap.

Other types of arrangement in which each detector 28 gathers a series of measurements in a sequence of separate measurement periods and in which measurements of the detectors 28 overlap each other may be used, if desired.

Figure 9:
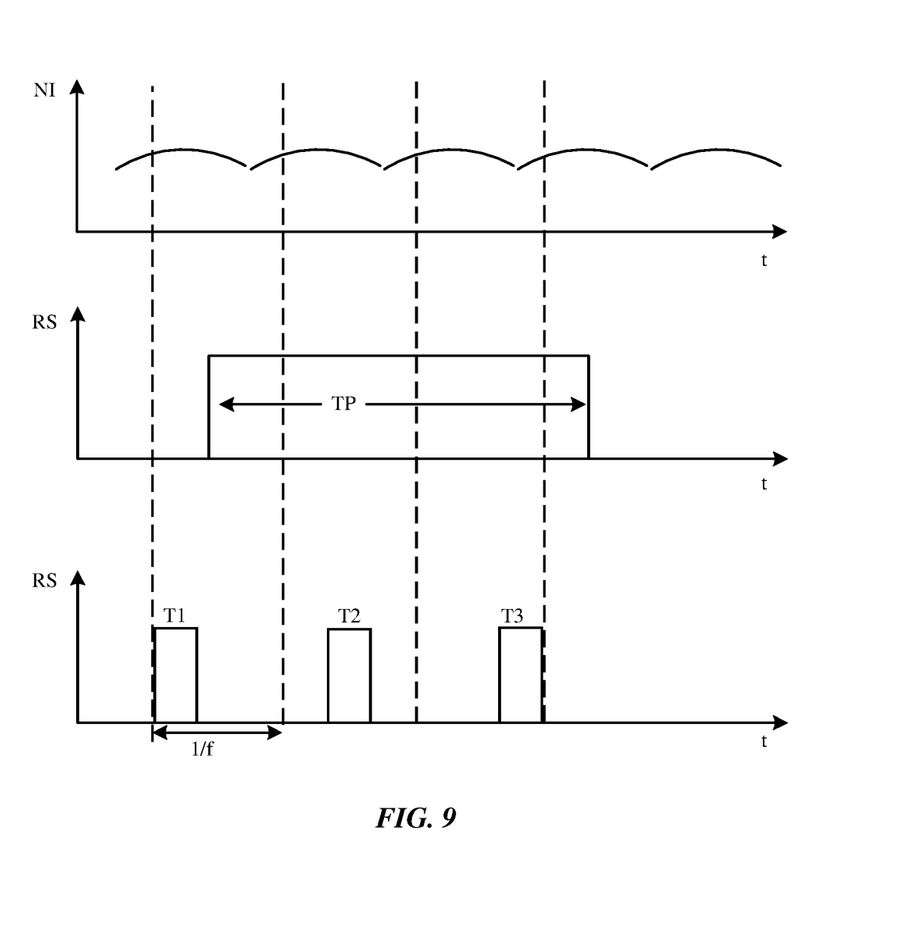
FIG. 9 is a diagram of illustrative color ambient light sensor integration schemes for an electronic device in accordance with an embodiment.

FIG. 9 is a graph of an illustrative multiple-flicker-period measurement technique and an illustrative swept-phase measurement technique that may be used in gathering color ambient light sensor measurements in system 8. In these arrangements, control circuitry 16 uses flicker period information (e.g., flicker signal frequency and/or phase information) in gathering color ambient light sensor arrangements. Light source output may vary widely in intensity, which may pose challenges in gathering sensor measurements that are free of noise while avoiding color ambient light sensor saturation. Light source output may also vary in color across a flicker period, which raises the potential for color measurement inaccuracies if only a portion of a flicker period is sampled. These potential sources of inaccuracy can be avoided by controlling (e.g., synchronizing) the operation (e.g., the gain) of color ambient light sensor 30 based on flicker information gathered with flicker detector 26.

The uppermost trace of FIG. 9 shows illustrative ambient light intensity NI as a function of time. Illustrative light intensity NI is characterized by flicker and is varying with frequency f. Flicker sensor 26 may be used to measure frequency f and determine the phase of the flicker present in ambient light. Control circuitry 16 can then use information about the timing of the flicker in the ambient light signal (e.g., the frequency f and, if desired, the phase of ambient light flicker), to control the operation of color light sensor control circuitry 16.

In low light conditions (e.g., when ambient light intensity is below a predetermined threshold), the sensitivity (gain) of the color ambient sensor may be high for a period TP that extends across multiple flicker periods (1/f), as shown in the middle trace of FIG. 9. The flicker frequency f may be determined from frequency analysis (e.g., application of a frequency transform such as a Fourier transform to sampled flicker data). Once the flicker frequency f is known (e.g., from a flicker sensor measurement), color ambient light sensor measurement operations can be synchronized with the flicker in the ambient light and color ambient light sensor data can be gathered by color ambient light sensor 30 (sensor gain RS can be high) for an integral number of flicker periods (e.g., measurement period TP can be equal to N*(1/f)). Light source output may vary within a flicker period, so this arrangement ensures that these sub-flicker-period variations will be averaged out over multiple periods and will not adversely affect color measurement accuracy.

In high ambient light conditions (e.g., when ambient light intensity is more than the predetermined threshold), a swept phase measurement technique may be used when gathering color ambient light sensor measurements. This may help prevent color ambient light sensor saturation while ensuring that all portions of the flicker period are sampled to average out color variations. As shown in the lower trace of FIG. 9, for example, three separate color ambient light sensor periods T1, T2, and T3 may be used to gather color ambient light sensor data with sensor 30. Each of these periods may be shifted in phase relative to the next. Measurement period size may be selected to be a subset of the flicker period (e.g., a third of a flicker period in this example). During measurement operations, control circuitry 16 can vary the relative phase between each color ambient light sensor measurement period and the phase of the flicker in the ambient light signal progressively. By sweeping the phase of the measurement period across a flicker period, an entire flicker period can be measured. In the FIG. 9 example, each color ambient light sensor measurement period (T1, T2, and T3) is shifted by one third of a flicker period relative to the next. By sweeping the phase of the color ambient light sensor measurement period across the flicker period in this way, color ambient light sensor data can be gathered in high ambient light intensity conditions without saturating the color ambient light sensor. Color measurement inaccuracies that might otherwise arise from gathering measurements across only a portion of a flicker period or a non-integral number of flicker periods may also be avoided.

Figure 10:
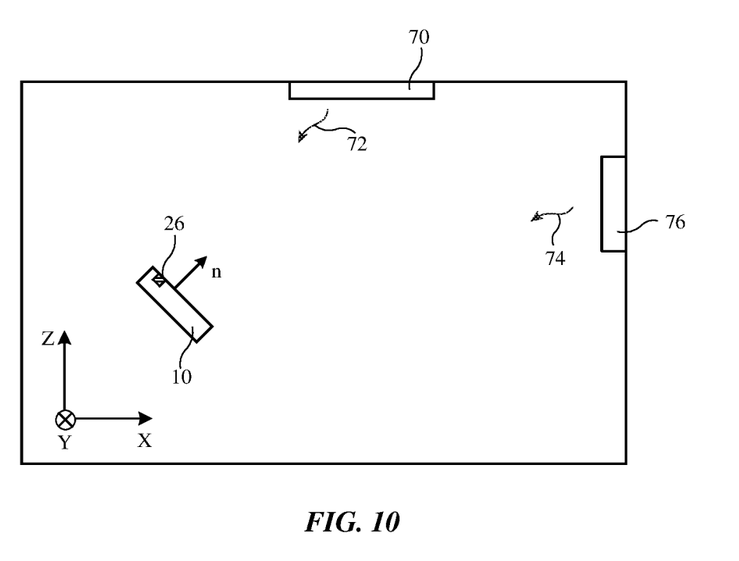
FIG. 10 is a diagram of an illustrative environment in which an electronic device with a flicker sensor makes multiple measurements at multiple corresponding device orientations in accordance with an embodiment.

FIG. 10 is a diagram of an illustrative operating environment with multiple light sources. Light source 70 may be, for example, a light-emitting-diode ceiling lamp that emits first ambient light portion 72 and light source 76 may be a fluorescent light that emits second ambient light portion 74.

Flicker sensor 26 in device 10 may face in a direction parallel to device surface normal n. The direction in which flicker sensor 26 gathers ambient light measurements (e.g., the orientation of surface normal n relative to coordinate axes X, Y, and Z in the user's environment) changes during use of device 10 (e.g., as the user moves device 10 during normal operation). Accordingly, multiple flicker measurements may be gathered in multiple different directions by taking these measurements in sequence. Two different flicker measurements in two respective directions may, as an example, be gathered by taking two different flicker measurements at two different respective times t1 and t2. The use of flicker sensor readings gathered from multiple directions can be used by device 10 to determine the number of light sources in the operating environment of device 10, provided that number of different directions and different measurements (N) exceeds the number of light sources (M) that are present. The number of light sources identified as being present can be used during the operations of block 52 to determine whether a single or multiple light sources are contributing to the ambient light surrounding device 10 (e.g., whether operations should proceed to block 56 or block 54 in FIG. 5).

| Table of Reference Numerals | | | |
|---|---|---|---|
| 8 | System | 10 | Electronic Device |
| 12 | Input-Output Device | 14 | Display |
| 16 | Control Circuitry | 18 | Sensors |
| 20 | Communication Path | 22 | Equipment |
| 26 | Flicker Sensors | 28 | Flicker Detector |
| 30 | Color Ambient Light Sensor | 32 | Image Sensor |
| 70 | Light Source | 72 | Light Portion |
| 74 | Light Portion | 76 | Light Source |

The foregoing is merely illustrative and various modifications can be made to the described embodiments. The foregoing embodiments may be implemented individually or in any combination.

What is claimed is:

1. An electronic device operable in an environment with ambient light, comprising:
   a housing;
   a display in the housing;
   a color flicker sensor that measures changes in the ambient light over time to produce color flicker sensor data; and
   control circuitry in the housing that:
      transforms the color flicker sensor data with a frequency transform to produce frequency component information for the color flicker sensor data; and
      adjusts a white point associated with the display using the frequency component information.

2. The electronic device defined in claim 1 further comprising:
   a color ambient light sensor that measures the ambient light to produce color ambient light sensor data, wherein the control circuitry adjusts the white point using the color ambient light sensor data and the frequency component information.

3. The electronic device defined in claim 2 wherein the control circuitry identifies a color spectrum of the ambient light by retrieving the color spectrum from a color database.

4. The electronic device defined in claim 3 wherein the control circuitry retrieves the color spectrum from the color database using the color ambient light sensor data.

5. The electronic device defined in claim 4 wherein the ambient light is produced by a number of different light sources and wherein the control circuitry:
   identifies the number by counting fundamental frequencies present in the frequency component information; and
   uses the identified number in retrieving the color spectrum from the color database.

6. The electronic device defined in claim 5 wherein the color database includes a first portion with entries for single-source lighting conditions and a second portion with entries for mixed-source lighting conditions and wherein the control circuitry uses the first portion of the color database in retrieving the color spectrum in response to determining that the number is one.

7. The electronic device defined in claim 5 wherein the color database includes a first portion with entries for single-source lighting conditions and a second portion with entries for mixed-source lighting conditions and wherein the control circuitry uses the second portion of the color database in retrieving the color spectrum in response to determining that the number is greater than one.

8. The electronic device defined in claim 1 wherein the color flicker sensor includes a first flicker detector and a second flicker detector, wherein the first flicker detector detects light in a first sequence of time periods, wherein the second flicker detector detects light in a second sequence of time periods, and wherein the first and second sequences of time periods are staggered with respect to each other and partially overlap each other.

9. An electronic device operable in an environment with ambient light, comprising:
   a housing;
   an electrical component in the housing, wherein the electrical component comprises an electrical component selected from the group consisting of: a display and an image sensor;
   a flicker sensor that measures changes in the ambient light over time to produce flicker sensor data;
   a color ambient light sensor;
   control circuitry in the housing that:
      uses the flicker sensor data to control the color ambient light sensor to produce color ambient light sensor data; and adjusts a white point associated with a selected one of: the display and the image sensor using the color ambient light sensor data.

10. The electronic device defined in claim 9 wherein the flicker sensor data comprises flicker frequency information and wherein the control circuitry gathers the color ambient light sensor data with the color ambient light sensor based on the flicker frequency information.

11. The electronic device defined in claim 10 wherein a flicker period is associated with the flicker frequency information and wherein the control circuitry uses the color ambient light sensor to gather the color ambient light sensor data for a time period equal to an integral number times the flicker period.

12. The electronic device defined in claim 9 wherein the ambient light is characterized by flicker having a flicker phase and wherein the control circuitry:
   obtains information on the flicker phase from the flicker sensor data; and
   uses the color ambient light sensor to detect portions of the color ambient light sensor data during a series of respective light detection periods having phases that are respectively varied by the control circuitry relative to the flicker phase.

13. The electronic device defined in claim 9 wherein the ambient light is characterized by a flicker period and wherein the control circuitry sweeps a color ambient light sensor detection period for the color ambient light sensor across the flicker period.

14. The electronic device defined in claim 9 wherein the flicker sensor has first and second flicker detectors.

15. The electronic device defined in claim 14 wherein the first flicker detector gathers a first portion of the flicker sensor data during a first sequence of time periods, wherein the second flicker detector gathers a second portion of the flicker sensor data during a second sequence of time periods, and wherein the first and second sequences of time periods are staggered with respect to each other and partially overlap each other.

16. An electronic device operable in an environment with ambient light produced by a number of light sources, comprising:
   a housing;
   an electrical component in the housing, wherein the electrical component comprises an electrical component selected from the group consisting of: a display and an image sensor;
   a flicker sensor that measures the ambient light in each of multiple different directions to produce flicker sensor data;
   a color ambient light sensor that produces color ambient light sensor data; and
   control circuitry in the housing that:
      identifies the number of light sources from the flicker sensor data; and
      adjusts a white point associated with a selected one of: the display and the image sensor using the color ambient light sensor data and the identified number of light sources.

17. The electronic device defined in claim 16 wherein the control circuitry:
   identifies a color spectrum of the ambient light by retrieving the color spectrum from a color database using the color ambient light sensor data and the identified number of light sources; and
   adjusts the white point based on the color spectrum.

18. The electronic device defined in claim 17 wherein the color database includes a first portion with entries for single-source lighting conditions and a second portion with entries for mixed-source lighting conditions and wherein the control circuitry uses the first portion of the color database in retrieving the color spectrum in response to determining that the number is one.

19. The electronic device defined in claim 17 wherein the color database includes a first portion with entries for single-source lighting conditions and a second portion with entries for mixed-source lighting conditions and wherein the control circuitry uses the second portion of the color database in retrieving the color spectrum in response to determining that the number is greater than one.

20. The electronic device defined in claim 16 wherein the flicker sensor comprises a first flicker detector and a second flicker detector.

* * * * *